US012340791B1

(12) United States Patent
Price et al.

(10) Patent No.: US 12,340,791 B1
(45) Date of Patent: Jun. 24, 2025

(54) ENHANCED VOICE-BASED PRESENTATION OF USER SENTIMENT

(71) Applicant: Amazon Technologies, Inc., Seattle, WA (US)

(72) Inventors: Layne Christopher Price, Seattle, WA (US); Bertrand Haas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 704 days.

(21) Appl. No.: 17/344,688

(22) Filed: Jun. 10, 2021

(51) Int. Cl.
*G10L 15/02* (2006.01)

(52) U.S. Cl.
CPC ......... *G10L 15/02* (2013.01); *H04M 2250/12* (2013.01)

(58) Field of Classification Search
CPC ............................ G10L 15/02; H04M 2250/12
See application file for complete search history.

(56) References Cited

U.S. PATENT DOCUMENTS

| | | | |
|---|---|---|---|
| 9,396,180 B1* | 7/2016 | Salvador | H04N 21/26603 |
| 10,019,489 B1* | 7/2018 | Adair | G06V 40/174 |
| 10,049,397 B1* | 8/2018 | Patankar | G06Q 30/0631 |
| 10,262,555 B2* | 4/2019 | Campbell | G06F 40/274 |
| 10,685,670 B2* | 6/2020 | Levi | G06F 16/958 |
| 10,863,939 B2* | 12/2020 | Silawan | H04N 21/44218 |
| 11,232,509 B1* | 1/2022 | Koka | G06F 3/017 |
| 11,373,446 B1* | 6/2022 | Beisel | G10L 25/63 |
| 11,430,467 B1* | 8/2022 | Vasudevan | G10L 25/63 |
| 11,532,300 B1* | 12/2022 | Bone | G06F 40/284 |
| 11,632,456 B1* | 4/2023 | Mevorah | H04M 1/72454 455/420 |
| 11,854,575 B1* | 12/2023 | Pinkus | G10L 25/63 |
| 2005/0063352 A1* | 3/2005 | Amara | H04L 63/20 370/338 |
| 2007/0071206 A1* | 3/2007 | Gainsboro | H04M 3/42221 379/168 |
| 2008/0059158 A1* | 3/2008 | Matsuo | H04M 1/21 704/E11.001 |
| 2014/0143064 A1* | 5/2014 | Tran | A61B 5/01 705/14.66 |
| 2015/0106726 A1* | 4/2015 | Nagasaki | G06F 3/04842 715/739 |
| 2015/0110277 A1* | 4/2015 | Pidgeon | H04R 3/00 381/56 |
| 2016/0217488 A1* | 7/2016 | Ward | G06Q 30/0256 |
| 2016/0234595 A1* | 8/2016 | Goran | G05B 15/02 |
| 2016/0283684 A1* | 9/2016 | Kinbarovsky | G16H 10/40 |
| 2017/0214962 A1* | 7/2017 | Ono | H04N 21/4131 |
| 2017/0215745 A1* | 8/2017 | Felix | A61B 5/7225 |

(Continued)

*Primary Examiner* — Fariba Sirjani
(74) *Attorney, Agent, or Firm* — Eversheds Sutherland (US) LLP

(57) ABSTRACT

Devices, systems, and methods are provided for voice-based presentation of a user's sentiment. A method may include receiving, by a device, voice data of a person at a time; determining, based on the voice data, an energy level of the person at the time; determining, based on the voice data, a sentiment level of the person at the time; selecting a presentation color indicative of the sentiment level; determining, based on the energy level, a first brightness of the first presentation color; and presenting an indication of the presentation color and the time.

20 Claims, 10 Drawing Sheets

(56) References Cited

U.S. PATENT DOCUMENTS

| | | | |
|---|---|---|---|
| 2018/0267759 A1* | 9/2018 | Llewelyn | G06F 1/163 |
| 2018/0335756 A1* | 11/2018 | Kim | G04B 45/0015 |
| 2019/0014649 A1* | 1/2019 | Kim | H05B 45/20 |
| 2019/0115045 A1* | 4/2019 | Jarvis | G10L 17/00 |
| 2019/0236968 A1* | 8/2019 | Otwell | G09B 5/02 |
| 2020/0012494 A1* | 1/2020 | Konik | G06F 40/30 |
| 2020/0302952 A1* | 9/2020 | Pinkus | H04W 4/80 |
| 2021/0085233 A1* | 3/2021 | Kotikela | A61B 5/1126 |
| 2021/0090592 A1* | 3/2021 | Lee | G10L 15/26 |
| 2021/0298647 A1* | 9/2021 | Axo | A61B 5/125 |
| 2021/0336694 A1* | 10/2021 | Takahashi | H04B 10/038 |
| 2021/0388979 A1* | 12/2021 | Maderic | F21V 33/0008 |
| 2023/0027828 A1* | 1/2023 | Aguilar Alas | G10L 25/63 |

\* cited by examiner

… (1) …

ENHANCED VOICE-BASED PRESENTATION OF USER SENTIMENT

BACKGROUND

People increasingly are using devices to provide information. For example, some people use devices to provide information about the peoples' activities. However, some types of user activities are not presented conveniently to the device user.

Figure 1:
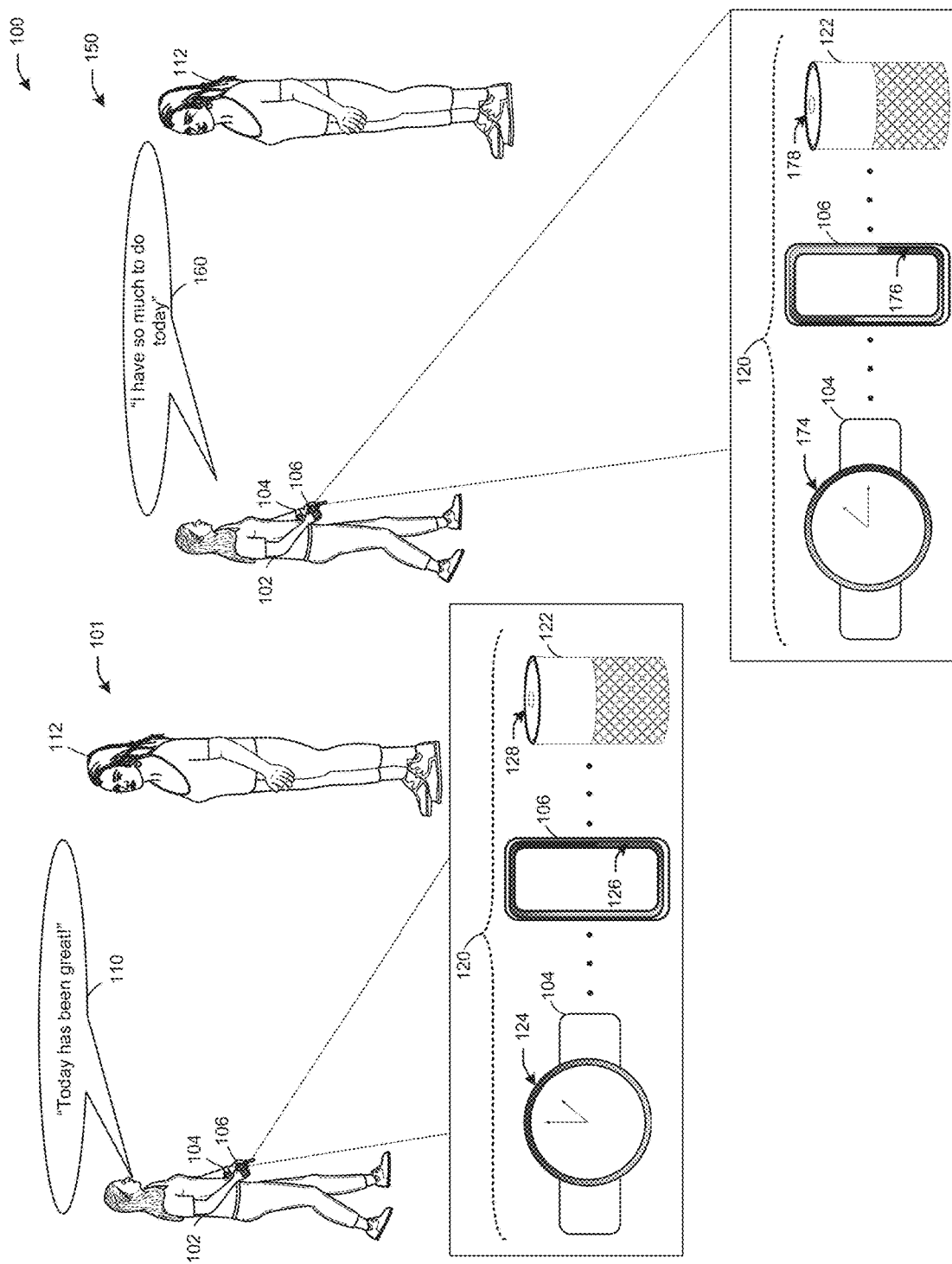
FIG. 1 illustrates an example system for voice-based presentation of user sentiment, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for voice-based presentation of a user's sentiment.

When people talk, their tones of voice may indicate their emotional state. For example, the pitch, cadence, intensity, and tone of a person's speech may indicate significant energy of the speaker, and/or whether the speaker is in a positive or negative mood.

A listener may perceive a speaker's sentiment based on the way that the speaker talks, as the way that someone speaks may affect a listener based on the listener's perception of the excitement and sentiment of a person's speech. Information about the emotional state that they are expressing may be useful to helping a person better interact with the people around them, improve their relationships with others, and may also improve the person's physical wellbeing.

However, some devices lack a convenient way to present information to a person regarding the person's perceived emotional state based on the person's speech.

In one or more embodiments, a device (e.g., a smartphone, wearable device, etc.) may, with user permission and in accordance with relevant laws, capture a user's voice (e.g., using a microphone), and may assess the user's voice at different times to determine the user's sentiment level (e.g., positive/happy or negative/unhappy) and the user's energy level (e.g., low intensity or high intensity). Based on the user's sentiment and energy levels, the device may present colors that correspond to the sentiment level with brightness that corresponds to the energy levels. The color and brightness of a person's speech may be represented differently based on the user's sentiment and energy levels at a given time. For example, at 12:00 PM, the user may have one sentiment level and energy level, and at 1:00 PM, the user may have a different sentiment level and/or energy level. The device may present multiple sentiment and energy levels concurrently, indicating the user's sentiment and energy levels at different times.

In one or more embodiments, a person's tone of voice may be assigned to multiple categories by a device. The device may map the categories to a multi-dimensional axis (e.g., an X-axis corresponding the energy level, and a Y-axis corresponding to the sentiment level). For example, the sentiment axis may be represented by a spectrum of colors (e.g., dark blue being a very positive sentiment, lighter blue being a somewhat positive sentiment, yellow/orange representing a neutral sentiment, light red representing a somewhat negative sentiment, and darker red representing a very negative sentiment, although other color schemes may be used). For a given time, the color corresponding to the sentiment level of the person's voice at that time may be selected for presentation. The energy level at that time may be used to select the brightness/intensity level of the selected color. For example, a brighter red may indicate a higher energy level of a negative sentiment level, a less bright red may indicate a lower energy level of a negative sentiment level, a bright blue may indicate a higher energy level of a positive sentiment level, and a less bright blue may indicate a lower energy level of a positive sentiment level. By presenting colors with corresponding brightness levels at different times, the device may allow a user to see the user's perceived sentiment and energy levels at different times.

In one or more embodiments, the sentiment and energy levels may be presented over a period of time, such as the most recent hour (e.g., up to the current time), the last twenty-four hours, the last fifteen (or some other number) of minutes, or at a particular moment in time (e.g., the current time or a previous time). For example, a user may request a presentation of their sentiment and energy levels at a particular time (e.g., a moment) or during a particular time period. A watch device, for example, may use the hour and minute hands and a color display around the perimeter of the device display for the presentation (e.g., the entire perimeter of a circle, square, or other shape of display may indicate the sentiment and energy levels at different times, such as the last sixty minutes, the last twenty-four hours, the last twenty minutes, or may represent the sentiment and energy levels at one moment in time indicated by the hour and minute hands of the watch). Smart glasses may present the sentiment and energy levels similarly. A smartphone display may present the sentiment and energy levels similarly, or may present a numeric display of the moment or start and end times corresponding to the presented sentiment and energy levels. Some examples of the presentation of sentiment and energy levels are shown in the figures, but are not meant to be limiting.

In one or more embodiments, in addition to or alternative to voice data, other types of data may be used to determine a person's sentiment and/or energy levels. For example, biometric data such as heart rate data and/or breathing rate data may correlate to a person's sentiment and/or energy levels based on whether a heart rate data and/or breathing rate increases or decreases (e.g., an increase in heart rate data and/or breathing rate may indicate an increasing sentiment and/or energy level).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for voice-based presentation of user sentiment, in accordance with one or more example embodiments of the present disclosure.

Figure 5:
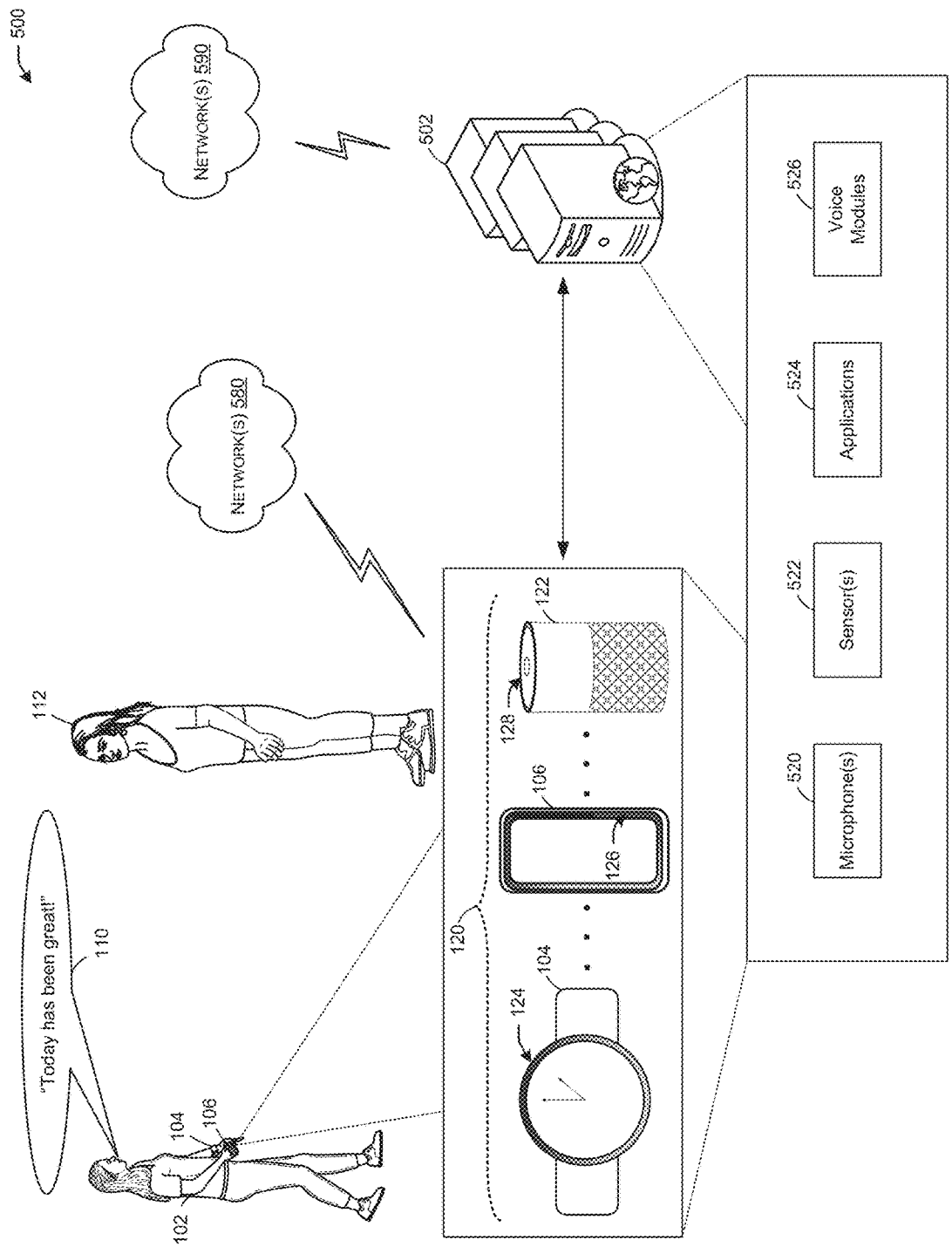
FIG. 5 illustrates an example system for voice-based presentation of user sentiment, in accordance with one or more example embodiments of the present disclosure.

Referring to FIG. 1, the system 100 may, at step 101, include a user 102 with multiple devices (e.g., a watch device 104, a smartphone device 106) who is talking (e.g., indicated by an utterance 110) to a user 112 (e.g., through a device or directly). One or more devices 120 (e.g., the watch device 104, the smartphone device 106, a smart home device 122, and the like) may, with user consent and in accordance with relevant laws, capture the utterance 110 (e.g., using a microphone as shown in FIG. 5), and may present indications of the user's utterance 110 (e.g., sentiment levels and intensity levels at one or more times). For example, indicator 124 may represent a display around the circumference/perimeter of the watch device 104. Indicator 126 may represent a display around the circumference/perimeter of the smartphone device 106. Indicator 128 may represent a display around the circumference/perimeter of the smart home device 122. As explained further herein, the indicators 124, 126, and 128 may present colors and brightness levels indicating the sentiment of the speech of the user 102 (e.g., including the utterance 110).

Still referring to FIG. 1, at step 150 (e.g., at a later time than step 101), the user 102 may be talking to the user 112, and may speak with utterance 160. At different times, the utterances 110 and 160 may be different from one another not only just in content (e.g., the specific words spoken), but in tone, pitch, and the like, and may indicate sentiment levels and intensity levels at different times when the user 102 is speaking. As shown, the watch device 104 may present an indicator 174, the smartphone device 106 may present an indicator 176, and/or the smart home device 122 may present an indicator 178, which may be the same as or different than the indicators shown at step 101 (e.g., depending on the user's sentiment levels and intensity levels at the respective times).

In one or more embodiments, based on the user's sentiment and energy levels, the one or more devices 120 may use the indicators 124, 126, 128, 174, 176, and/or 178 to present colors that correspond to the sentiment level with brightness that corresponds to the energy levels. The color and brightness of a person's speech (e.g., the utterances 110 and 160) may be represented differently based on the user's sentiment and energy levels at a given time. For example, at 2:00 PM (e.g., step 101), the user may have one sentiment level and energy level, and at 2:15 PM (e.g., step 150), the user may have a different sentiment level and/or energy level. The one or more devices 120 may present multiple sentiment and energy levels concurrently, indicating the user's sentiment and energy levels at the different times.

In one or more embodiments, the user's tone of voice may be assigned to multiple categories by a device. The one or more devices 120 may map the categories to a multi-dimensional axis (e.g., an X-axis corresponding the energy level, and a Y-axis corresponding to the sentiment level). For example, the sentiment axis may be represented by a spectrum of colors (e.g., dark blue being a very positive sentiment, lighter blue being a somewhat positive sentiment, yellow/orange representing a neutral sentiment, light red representing a somewhat negative sentiment, and darker red representing a very negative sentiment, although other color schemes may be used). For a given time, the color corresponding to the sentiment level of the person's voice at that time may be selected for presentation. The energy level at that time may be used to select the brightness/intensity level of the selected color. For example, a brighter red may indicate a higher energy level of a negative sentiment level, a less bright red may indicate a lower energy level of a negative sentiment level, a bright blue may indicate a higher energy level of a positive sentiment level, and a less bright blue may indicate a lower energy level of a positive sentiment level. By presenting colors with corresponding brightness levels at different times, the one or more devices 120 may allow the user 102 to see the user's perceived sentiment and energy levels at different times.

In one or more embodiments, the sentiment and energy levels of the indicators 124, 126, 128, 174, 176, and/or 178 may be presented over a period of time, such as the most recent hour (e.g., up to the current time), the last twenty-four hours, the last fifteen (or some other number) of minutes, or at a particular moment in time (e.g., the current time or a previous time). For example, the user 102 may request a presentation of their sentiment and energy levels at a particular time or during a particular time period. The watch device 104, for example, may use the hour and minute hands and a color display around the perimeter of the device display for the presentation (e.g., the entire perimeter of a circle, square, or other shape of display may indicate the sentiment and energy levels at different times, such as the last sixty minutes, the last twenty-four hours, the last twenty minutes, or may represent the sentiment and energy levels at one moment in time indicated by the hour and minute hands of the watch device 104). The smartphone device 106 may present the sentiment and energy levels similarly, or may present a numeric display of the moment or start and end times corresponding to the presented sentiment and energy levels.

The one or more devices 120 may include any suitable processor-driven device including, but not limited to, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2A:
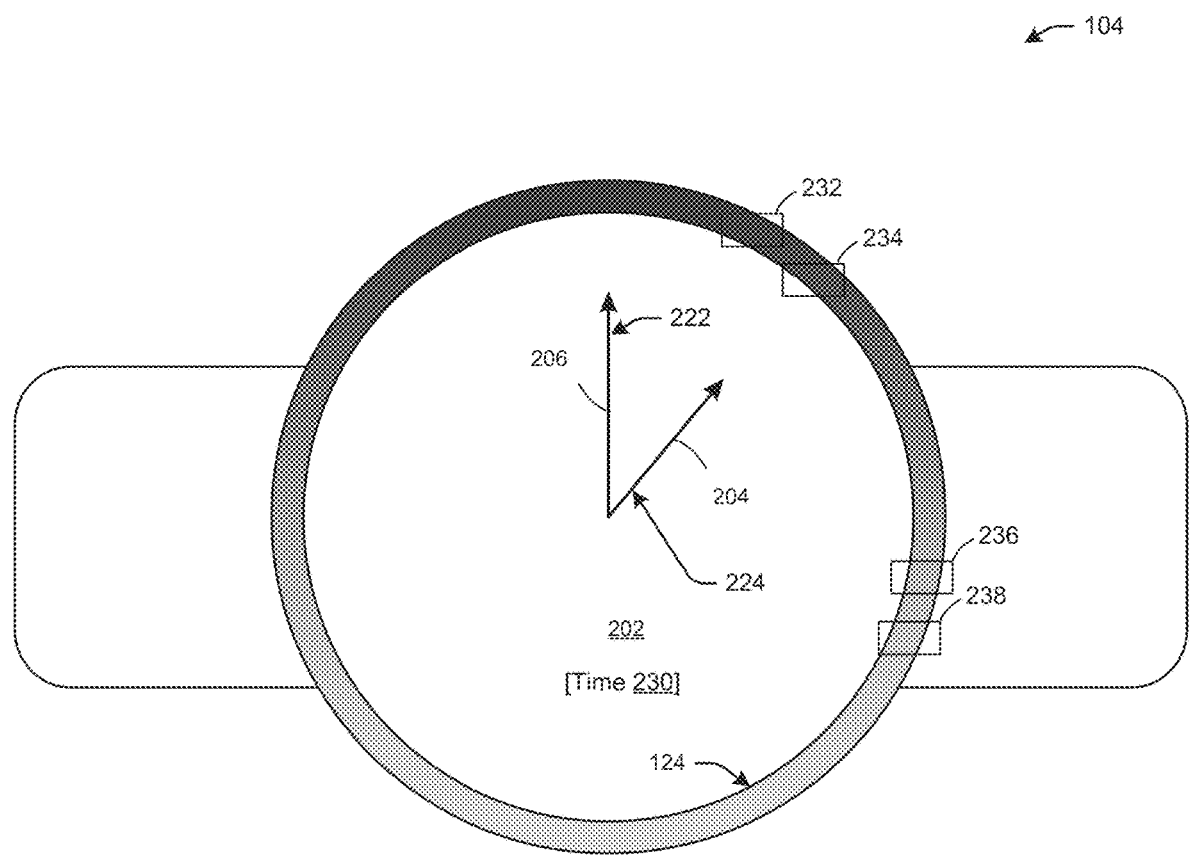
FIG. 2A illustrates an example voice-based presentation of user sentiment using a device of FIG. 1, in accordance with one or more example embodiments of the present disclosure.

FIG. 2A illustrates an example voice-based presentation of user sentiment using the watch device 104 of FIG. 1, in accordance with one or more example embodiments of the present disclosure.

Referring to FIG. 2A, the watch device 104 may have a display 202 (e.g., a watch face, digital display, etc.) that may include an hour hand 204 and a minute hand 206 (e.g., either mechanical components or digitally displayed). The minute hand 206 is shown at a position 222, and the hour hand 204 is shown at a position 224, the positions 222 and 224 corresponding to a time 230 (e.g., 1:00 AM or PM). A portion of the display 202 (e.g., the perimeter/circumference of the display 202) may present the indicator 124 of FIG. 1, which may include both color and brightness indicators, the color indicating a person's (e.g., the user 102 of FIG. 1) sentiment level, and the brightness of the color indicating the person's intensity level. For example, the color and brightness levels 232, 234, 236, and 238 are shown at different portions using the display 202, representing respective times corresponding to when the color and brightness levels 232, 234, 236, and 238 were exhibited by the person when talking.

In one or more embodiments, the indicator 124 may represent a period of time, such as the last hour (e.g., preceding and up to the time 230), the last twelve hours, the last twenty-four hours, or the like. When the period of time represents the last hour (e.g., from 12:00 PM-1:00 PM), the color and brightness levels 232, 234, 236, and 238 may represent the user's sentiment levels and intensity levels at different times during that time period. In particular, the color and brightness levels 232 may correspond to a time of 12:05 PM, the color and brightness levels 234 may correspond to a time of 12:10 PM, the color and brightness levels 236 may correspond to a time of 12:18 PM, and the color and brightness levels 238 may correspond to a time of 12:20 PM (e.g., the 12:00 position of the hour hand 204 and minute hand 206 indicates one hour before the time 230, with each portion of the indicator 124 increasing in time in a clockwise fashion for one full rotation of the circumference). When the period of time represents the last twelve hours, the 12:00 position of the hour hand 204 and minute hand 206 may represent a time twelve hours preceding the time 230, with each position of the indicator 124 indicating an increasing time from the time twelve hours preceding the time 230 in a clockwise fashion for one full rotation of the circumference (e.g., the 3:00 position of the hour hand 204 and minute hand 206 may represent three hours from the time twelve hours preceding the time 230, the 6:00 position of the hour hand 204 and minute hand 206 may represent six hours from the time twelve hours preceding the time 230, and so on). When the period of time represents the last twenty-four hours, the 12:00 position of the hour hand 204 and minute hand 206 may represent a time twenty-four hours preceding the time 230, with each position of the indicator 124 indicating an increasing time from the time twenty-four hours preceding the time 230 in a clockwise fashion for one full rotation of the circumference (e.g., the 3:00 position of the hour hand 204 and minute hand 206 may represent six hours from the time twenty-four hours preceding the time 230, the 6:00 position of the hour hand 204 and minute hand 206 may represent twelve hours from the time twenty-four hours preceding the time 230, and so on).

Figure 2B:
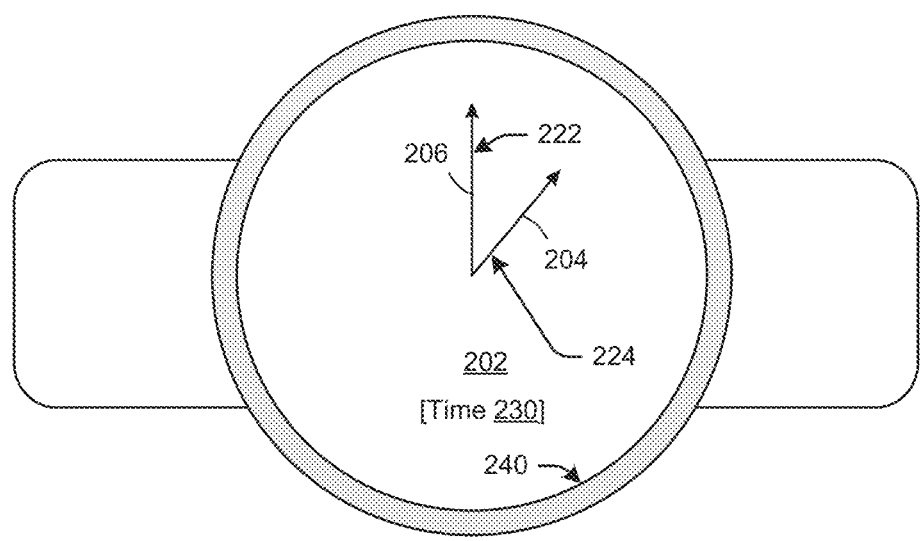
FIG. 2B illustrates an example voice-based presentation of user sentiment using a device of FIG. 1, in accordance with one or more example embodiments of the present disclosure.
Figure 2B:
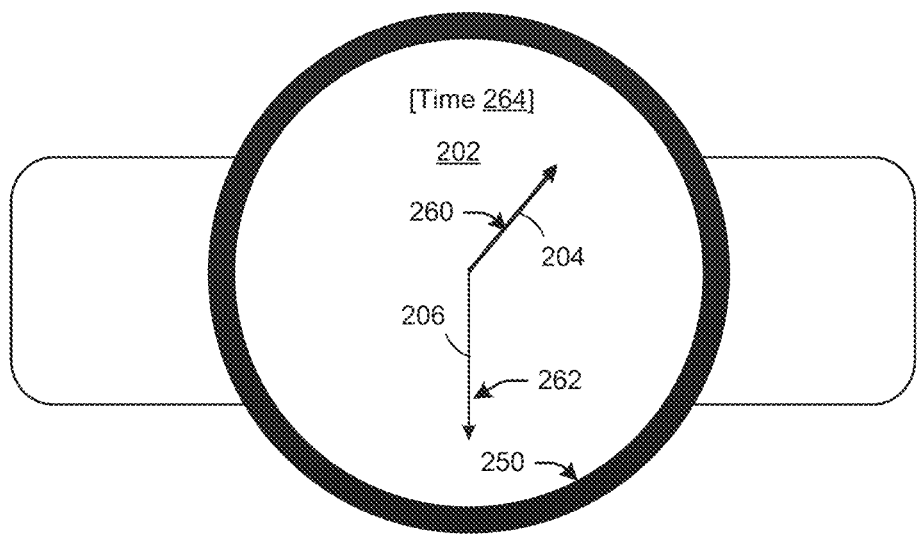

FIG. 2B illustrates an example voice-based presentation of user sentiment using the watch device 104 of FIG. 1, in accordance with one or more example embodiments of the present disclosure.

Referring to FIG. 2B, the watch device 104 may present a single user sentiment level and brightness level representing a user's (e.g., the user 102 of FIG. 1) sentiment level and brightness level at one time. For example, at time 230, the minute hand 206 of FIG. 2A is shown in the position 222, and the hour hand 204 is shown in the position 224, corresponding to the time 230 as presented using the display 202. Rather than representing a time period, as in FIG. 2A, however, the watch device 104 may present an indicator 240 showing one color and one brightness, indicating the user's sentiment level and intensity level at the time 230.

Still referring to FIG. 2B, at a different time (e.g., time 264 different than the time 230), the hour hand 204 may be in a position 260, and the minute hand 206 may be at a position 262. The indicator 250 presented using the display 202 may represent a different color and/or brightness level than presented by the indicator 240.

Figure 2C:
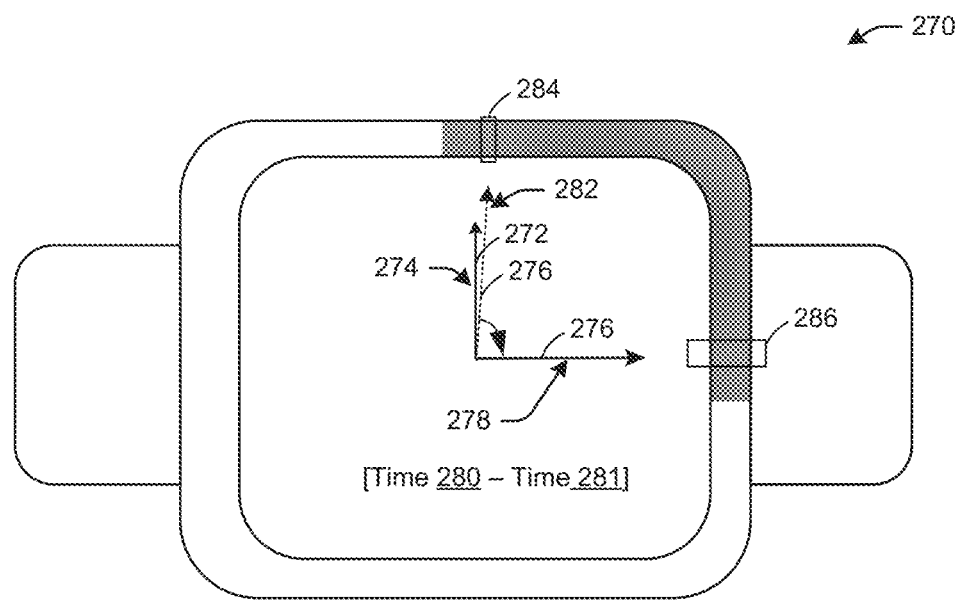
FIG. 2C illustrates an example voice-based presentation of user sentiment using a device, in accordance with one or more example embodiments of the present disclosure.
Figure 2C:
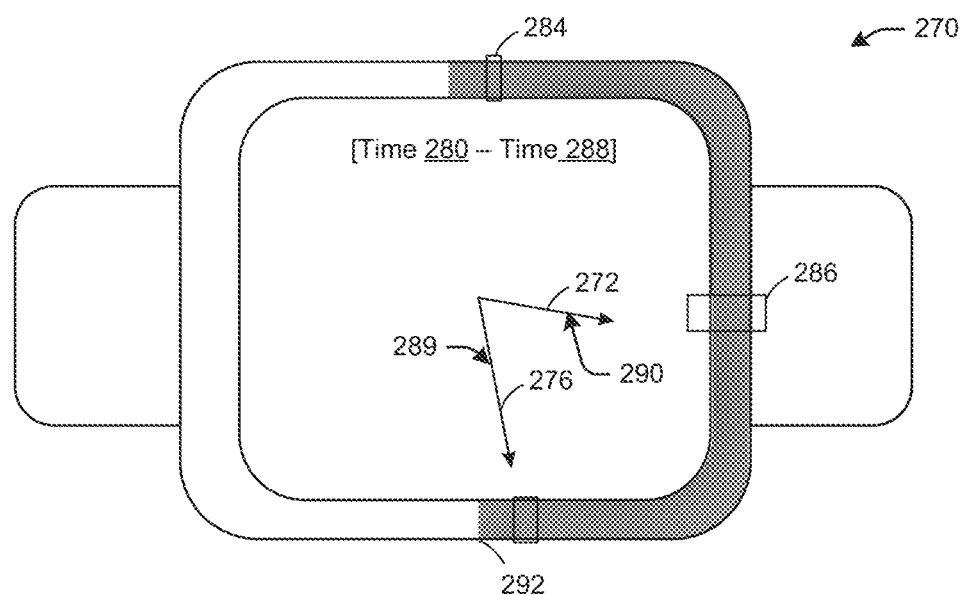

FIG. 2C illustrates an example voice-based presentation of user sentiment using a device 270, in accordance with one or more example embodiments of the present disclosure.

Referring to FIG. 2C, the device 270 may be a watch device similar to the watch device 104 of FIG. 1, but having a different display shape (e.g., square or rectangular rather than circular, etc.). In FIG. 2C, the device 270 may present a person's (e.g., the user 102 of FIG. 1) voice tone beginning at some start time and ending at the current time. As shown, an hour hand 272 (e.g., mechanical or digitally presented) may be at a position 274 and a minute hand 276 (e.g., mechanical or digitally presented) may be at a position 278 corresponding to a time 281 (e.g., the current time and end time for presentation of the user's sentiment and energy levels). A start time 280 may be any time, such as a preceding time when the minute hand 276 was at a position 282. In this manner, the color and brightness levels 284 shown at the top of the device 270 may correspond to the positions of the hour hand 272 and the minute hand 276, and as the minute hand 276 rotates in a clockwise fashion for one full rotation, any position (and time) of the positions of the hour hand 272 and the minute hand 276 during the rotation may correspond to sentiment level and energy level at the time (e.g., the location of a color and brightness level presentation may correspond to a time represented by the position of the minute hand 276 as it rotates). In this manner, color and brightness levels 284 may be presented on a position corresponding to the current time 281 (e.g., the minute hand 276 at the time 281 may point to the color and brightness levels 284).

Still referring to FIG. 2C, at time 288 (e.g., later than time 281), the minute hand 276 may have rotated more to position 289, and the hour hand 272 may have rotated to position 290. As shown, additional colors and/or brightness levels are shown between the time 281 and time 288, indicating respective sentiment and intensity levels between the time 281 and the time 288. In this manner, the time period represented may be from the time 280 to the time 288. In this manner, color and brightness levels 292 may be presented on a position corresponding to the current time 288 (e.g., the minute hand 276 at the time 288 may point to the color and brightness levels 292).

Figure 3:
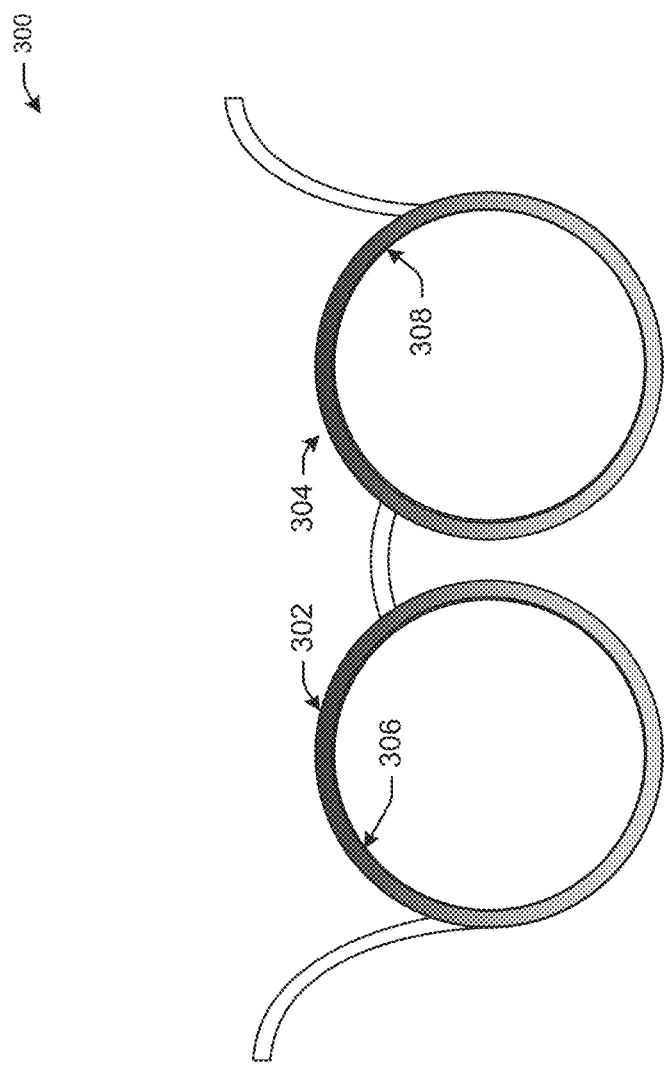
FIG. 3 illustrates an example voice-based presentation of user sentiment using a device, in accordance with one or more example embodiments of the present disclosure.

FIG. 3 illustrates an example voice-based presentation of user sentiment using a device 300, in accordance with one or more example embodiments of the present disclosure.

Referring to FIG. 3, the device 300 may be wearable smart glasses (e.g., one of the devices 120 of FIG. 1) capable of displaying a user's (e.g., the user 102 of FIG. 1) sentiment and intensity levels. As shown, either or both of the rims of the smart glasses may present indicators 306 and 308 showing one or more colors and/or brightness levels to indicate the user's sentiment and intensity levels at one or more times. Similar to FIGS. 2A-2C, the indicators 306 and 308 may represent a moment in time (e.g., as in FIG. 2B), or may represent periods of time (e.g., FIGS. 2A and 2C), such as a previous twelve or twenty-four hours.

Figure 4A:
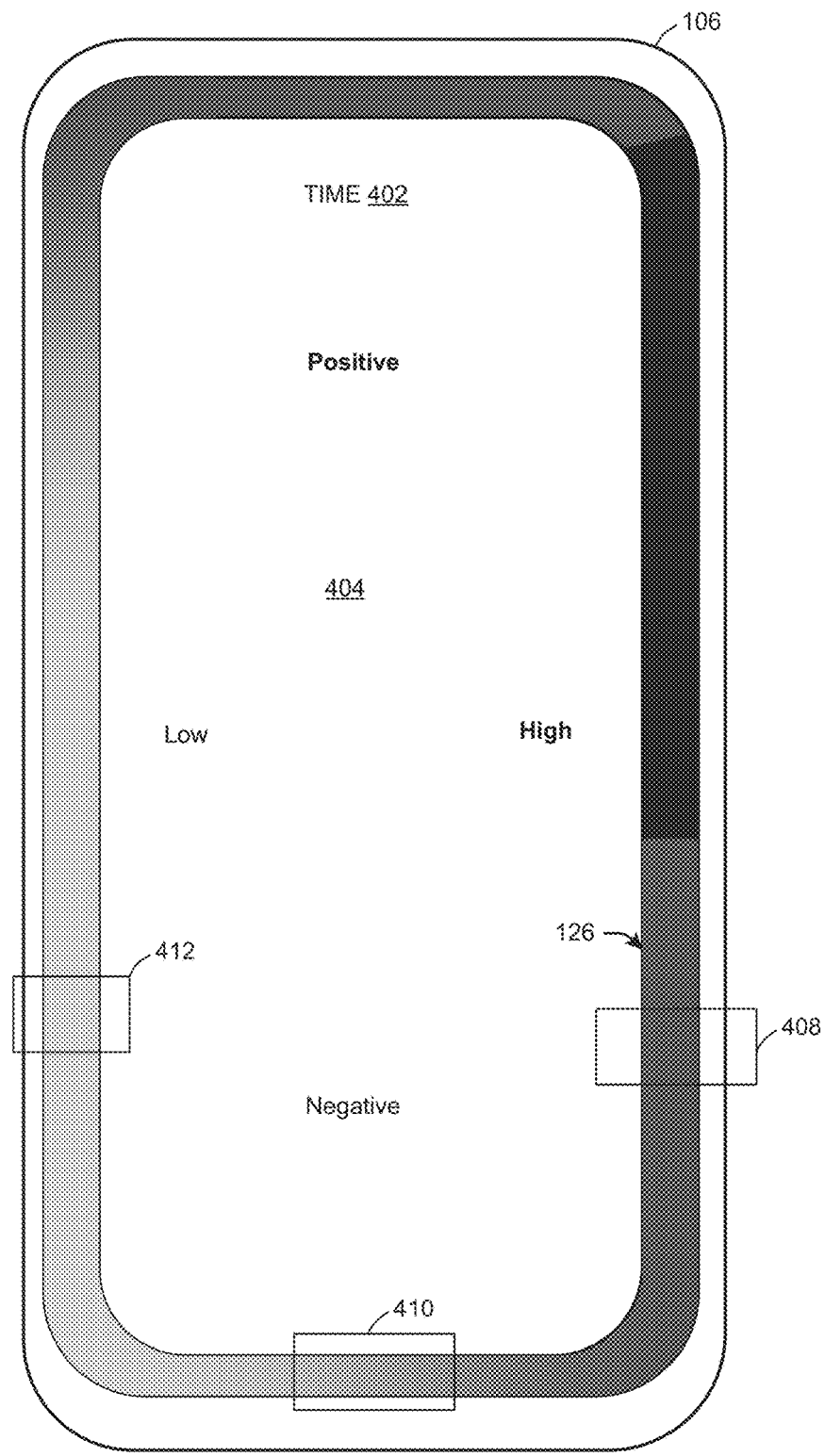
FIG. 4A illustrates an example voice-based presentation of user sentiment using a device of FIG. 1, in accordance with one or more example embodiments of the present disclosure.

FIG. 4A illustrates an example voice-based presentation of user sentiment using the smartphone device 106 of FIG. 1, in accordance with one or more example embodiments of the present disclosure.

Referring to FIG. 4A, the smartphone device 106 may present sentiment and intensity levels, and a current time 402. For example, the smartphone device 106 may present the indicator 126 of FIG. 1 as one or more colors and brightness levels around the perimeter of a display 404 of the smartphone device 106. Similar to FIGS. 2A-2C, the indicator 126 may represent a moment in time (e.g., as in FIG. 2B), or may represent periods of time (e.g., FIGS. 2A and 2C), such as a previous twelve or twenty-four hours. For example, a portion 408 of the indicator 126 may show a color at a brightness level representing a moment in time or portion of time. A portion 410 of the indicator 126 may show the same or another color at the same time or a different time. A portion 412 of the indicator 126 may show the same or another color at the same time or a different time. In this manner, the locations of the portions of the indicator 126 may correspond to different times, indicating the sentiment and intensity levels of a user (e.g., the user 102 of FIG. 1) at those times.

Figure 4B:
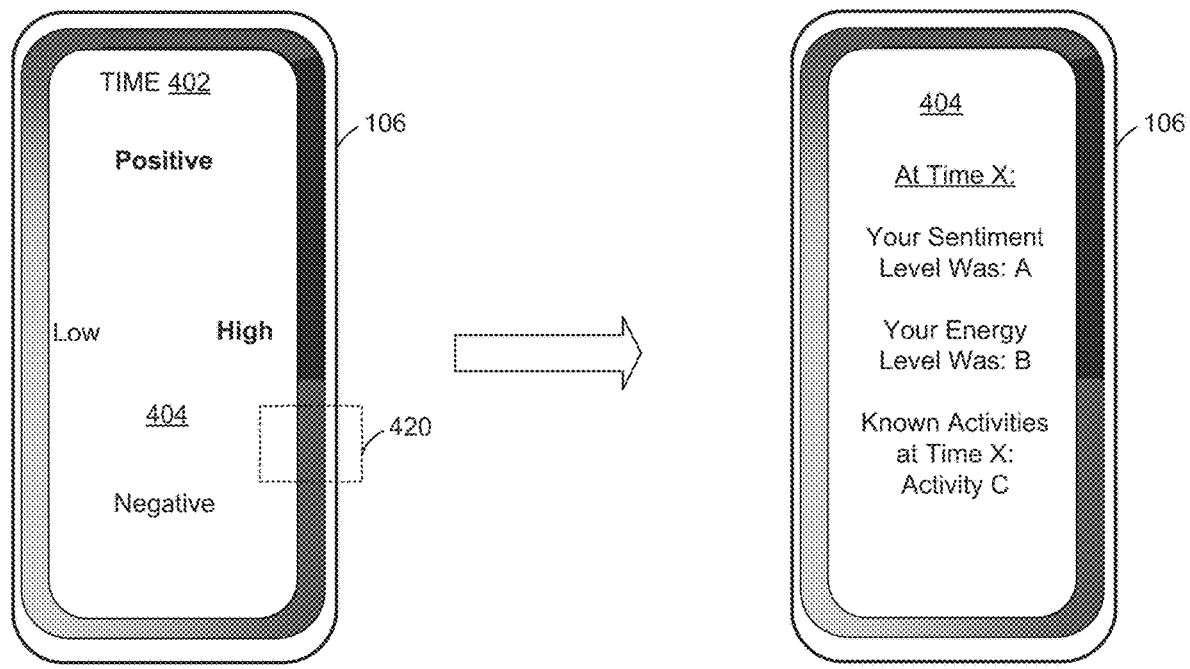
FIG. 4B illustrates an example voice-based presentation of user sentiment with supplemental information using the device of FIG. 4A, in accordance with one or more example embodiments of the present disclosure.

FIG. 4B illustrates an example voice-based presentation of user sentiment with supplemental information using the smartphone device 106 of FIG. 4A, in accordance with one or more example embodiments of the present disclosure.

Referring to FIG. 4B, when a user (e.g., the user 102 of FIG. 1) selects (e.g., touches, provides a voice input requesting information about a time, etc.) a portion of the indicator 126 (e.g., portion 420), the smartphone device 106 may present additional information (e.g., in addition to the color and brightness of the indicator 126). The additional information may be presented using the display 404 of the smartphone device 106. For example, the additional information may include an explanation of the sentiment level (e.g., positive, negative, neutral, etc.) at the time corresponding to the portion 420, an explanation of the energy level (e.g., high, medium, low, etc.) at the time corresponding to the portion 420, known activities at the time corresponding to the portion 420 (e.g., based on calendar or other application data made accessible to the smartphone device 106 with user consent, motion sensor data made accessible to the smartphone device 106 with user consent, biometric sensor data made accessible to the smartphone device 106 with user consent, etc.). In addition or alternatively, the smartphone device 106 may, with user opt-in and consistent with relevant laws, present audio, such as a recording of the user's voice at the time corresponding to the portion 420 (e.g., to allow the user to hear their voice and identify why it was scored with the sentiment and energy levels at that time).

Referring to FIGS. 2A-4B, any of the indications (color and brightness) may be presented using light flashes using a particular time and/or frequency that corresponds to sentiment and/or energy levels. For example, the speed (e.g., in time) with which a color is presented may correspond to a sentiment or energy level (e.g., a faster light flash may indicate a higher energy level or more positive sentiment level). Users may opt into the use of flashing lights to indicate the sentiment and/or energy levels.

FIG. 5 illustrates an example system 500 for voice-based presentation of user sentiment, in accordance with one or more example embodiments of the present disclosure.

Referring to FIG. 5, the one or more devices 120 of FIG. 1 may, with user consent, analyze the voice (e.g., the utterance 110) of the user 102 of FIG. 1 (e.g., in a conversation with the user 112 of FIG. 1) to determine the sensitivity and intensity levels of the voice at one or more times. The analysis of the voice for sensitivity and intensity may be performed by the one or more devices 120, or by a remote system 502 (e.g., a cloud-based system or another remote device). The one or more devices 120 and/or the remote system 502 may include one or more microphones 520 (e.g., to detect the voice), one or more sensors 522 (e.g., motion sensors whose data may indicate that a person is active or moving based on accelerometer data matching a motion profile indicative of device motion associated with exercise, biometric sensors whose data may indicate that a person is exercising, sedentary, or performing another activity), applications (e.g., calendar applications, activity applications, and the like, whose data may indicate any activities that a person may have been performing at a given time), and one or more voice modules 526 for analyzing voices, determining the user's sensitivity and intensity levels, and facilitating the presentation of colors and brightness levels indicative of the user's sensitivity and intensity levels.

In one or more embodiments, the one or more microphones 520 may detect audio data (e.g., the utterance 110). The one or more voice modules 526 may process the audio data to identify speech and/or background noise. Background noise may be indicative of a person's activity (e.g., riding in a vehicle, etc.). For example, the one or more voice modules 526 may analyze the audio data using frequency, energy, zero-crossing rate, and the like (e.g., with respect to threshold values) to identify characteristics indicative of human speech and background noise. The energy of a voice in the audio data may correspond to a brightness level (e.g., the brightness of one or more pixels corresponding to the color used to show a sentiment level at any time may be based on the energy level, such as brighter pixels used to present higher energy voice data at a particular time). The one or more voice modules 526 may use signal analysis, classifiers, neural networks, and the like to generate features of the audio data, such as vectors having values that represent features such as changing of pitch, speech cadence, energy intensity per phoneme, duration, and the like. For example, the audio feature data may be processed by a classifier to produce sentiment data that indicates a value of either "happy" (e.g., positive sentiment level), "sad" (e.g., negative sentiment level), neutral, and the like. When the audio data is analyzed, it may be labeled based on a confidence level indicating how likely the audio data is to be happy, sad, high intensity, low intensity, and the like.

In one or more embodiments, the one or more voice modules 526 may use the audio feature data to determine sentiment data. Human speech involves a complex interplay of biological systems on the part of the person speaking. These biological systems are affected by the physical and emotional state of the person. As a result, the speech of the user 102 may exhibit changes. For example, a person who is calm sounds different from a person who is excited. This may be described as "emotional prosody" and is separate from the meaning of the words used. For example, in some implementations the one or more voice modules 526 may use the audio feature data to assess emotional prosody without assessment of the actual content of the words used.

In one or more embodiments, the one or more voice modules 526 may determine the sentiment data indicative of a possible emotional state of the user 102 based on the audio feature data. The one or more voice modules 526 may determine various values that are deemed representative of an emotional state. In some implementations, these values may be representative of emotional primitives. For example, the emotional primitives may include valence, activation, and dominance. A valence value may be determined that is representative of a particular change in pitch of the user's voice over time. Certain valence values indicative of particular changes in pitch may be associated with certain emotional states. An activation value may be determined that is representative of pace of the user's speech over time. As with valence values, certain activation values may be associated with certain emotional states. A dominance value may be determined that is representative of rise and fall patterns of the pitch of the user's voice over time. As with valence values, certain dominance values may be associated with certain emotional states. Different values of valence, activation, and dominance may correspond to particular emotions. The one or more voice modules 526 may use other techniques. For example, the one or more voice modules 526 may determine Mel Frequency Cepstral Coefficients (MFCC) of at least a portion of the audio data. The MFCC may then be used to determine an emotional class associated with the portion. The emotional class may include one or more of angry, happy, sad, or neutral.

In one or more embodiments, the one or more voice modules 526 may perform analysis of the words spoken and their meaning. For example, an automated speech recognition (ASR) system may be used to determine the text of the words spoken. This information may then be used to determine the sentiment data. For example, presence in the audio data of words that are associated with a positive connotation, such as compliments or praise, may be used to determine the sentiment data. In another example, word stems may be associated with particular sentiment categories. The word stems may be determined using ASR, and the particular sentiment categorizes determined.

In one or more embodiments, the one or more voice modules 526 may express the sentiment data as one or more numeric values, vectors, words, and so forth. For example, the sentiment data may include one or more vectors in an n-dimensional space. In another example, the sentiment data may include associated labels. For example, a machine learning system may be trained to associate particular feature data with particular labels indicative of emotional state. In another example, particular combinations of other values, such as valence, activation, and dominance values may determine the labels. The sentiment data may include values that are non-normative. For example, a sentiment value that is expressed as a negative number may not be representative of an emotion that is considered bad.

In one or more embodiments, the one or more voice modules 526 may process sensor data from the one or more sensors 522, and generate user status data. For example, the sensor data obtained from the one or more sensors 522 may include information about movement obtained from an accelerometer, pulse rates obtained from a pulse oximeter, and so forth. The user status data may include information such as total movement by the one or more devices 120 during particular time intervals, pulse rates during particular time intervals, heart rates during particular time intervals, and so forth. The user status data may provide information that is representative of the physiological state of the user 102. The sentiment data may be determined based at least in part on the user status data. For example, information about the pulse rate at a given time of the user 102 with respect to their normal baseline pulse rate may be used as an input in conjunction with the audio feature data to the one or more voice modules 526.

In one or more embodiments, the one or more voice modules 526 may rank the sentiment and/or intensity levels based on their confidence levels. For example, any portion of audio data that represents the user's voice may have multiple classifiers used to describe the user's sentiment levels and intensity levels with respective degrees of confidence. The higher the confidence level indicating whether voice data is positive, negative, high intensity, low intensity, etc., the more likely the voice data indicates the corresponding sentiment and intensity levels. In this manner, a higher confidence level that a voice at a particular time exhibited a positive sentiment level than the confidence level indicating that the voice exhibited a negative sentiment level may suggest that the voice was more likely to be positive, and may be considered as positive at the time. A higher confidence level that a voice at a particular time exhibited a higher intensity level than the confidence level indicating that the voice exhibited a lower intensity level may suggest that the voice was more likely to be higher intensity, and may be considered as higher intensity at the time.

In one or more embodiments, the one or more voice modules 526 may select a color to represent the sentiment level at a particular time, and may select a brightness with which to present the selected color to indicate the intensity level at the time. Using the selected colors and brightness levels at one or more times, the one or more voice modules 526 may facilitate the presentation of the indicators shown in FIGS. 1-4B to present the sentiment and intensity levels of a person's voice. The one or more voice modules 526 also may present data from the one or more sensors 522 and/or the applications 524 to show what activities, if any, were associated with the person's sentiment and intensity levels (e.g., was the person exercising, in a meeting, static, on the move, etc.). Alternatively or in addition, the one or more voice modules 526 may determine whether data from the one or more sensors 522 indicates a particular activity, such as when biometric and/or device motion data (e.g., accelerometer data, etc.) are above or below threshold values indicating that a person was moving, breathing heavily, exhibited an elevated heart rate (e.g., indicating exercising), or the like (e.g., a breathing rate or heart rate exceeding a respective threshold value may indicate that the person was exercising). Similarly, the one or more voice modules 526 may analyze audio from the one or more microphones to identify background noise (e.g., indicating that the user 102 was in a vehicle, in a crowd, etc.). In this manner, activities may correlate to sentiment and/or energy levels, allowing the user 102 to see and hear how their voice sounds (e.g., to the user 112) at different times based on their activities. The sentiment levels and/or intensity levels may be presented using the one or more devices 120, along with any supplemental information regarding user activity, based on the analysis performed locally or by the remote system 502 (e.g., the one or more devices 120 may provide data to the remote system 502 for analysis, and the remote system 502 may provide the data for presentation to the one or more devices 120).

Any of the one or more devices 120 and or the remote system 502 may be configured to communicate with each other via one or more communications networks 580 and/or 590 wirelessly or wired. Any of the communications networks 580 and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 580 and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 580 and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 6:
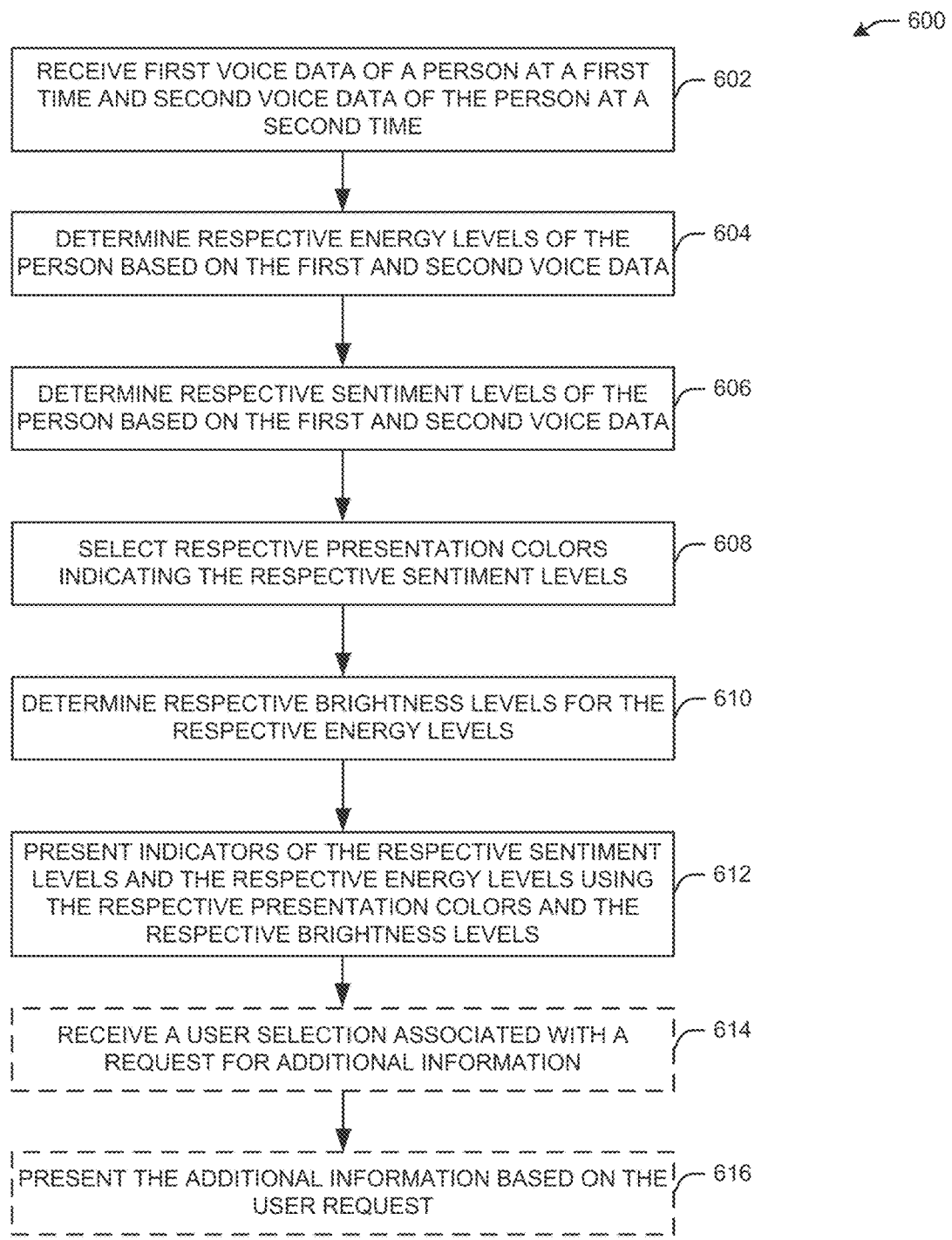
FIG. 6 illustrates a flow diagram for a process for voice-based presentation of user sentiment, in accordance with one or more example embodiments of the present disclosure.

FIG. 6 illustrates a flow diagram for a process 600 for voice-based presentation of user sentiment, in accordance with one or more example embodiments of the present disclosure.

At block 602, a system (e.g., the one or more devices 120 of FIG. 1, the remote system 502 of FIG. 5) may receive voice data of a person (e.g., the user 102 of FIG. 1) at different times (e.g., first voice data including the utterance 110 of FIG. 1, second voice data including the utterance 160 of FIG. 1, etc.). The voice data may be detected by microphones (e.g., the one or more microphones 520 of FIG. 5) when the person is talking (e.g., using the one or more devices 120 of FIG. 1, or directly to another person). The voice data may be detected along with other audio data, such as background noise that may indicate that the person is active, moving, in a crowded or loud area, etc. (e.g., when the level of background noise exceeds a noise threshold, when the signal-to-noise ratio of the audio that includes the voice data is below a threshold, etc.). In addition, the system may detect motion and/or biometric data with the person's consent, as the motion and/or biometric data may indicate a user's activities occurring during or before the person's speech corresponding to the voice data. The system also may receive application data with user consent (e.g., data corresponding to a calendar, indicating the type of activities that the person may have been performing during or before speaking).

At block 604, the system may determine respective energy (e.g., intensity) levels of the voice data (e.g., a first energy level of the first voice data corresponding to a first time when the first voice data was spoken, a second energy level of the second voice data corresponding to a second time when the second voice data was spoken, and so forth). For example, pace (e.g., words per unit time), pitch, loudness, and other characteristics may indicate a higher or lower intensity level. The voice data may be scored with a level of confidence that the voice data indicates a higher or lower intensity level based on language analysis that results in vectors (e.g., feature data) that provides values indicating speech characteristics, such as pitch, loudness, pace, and the like, with different values of the characteristics corresponding to an intensity level (e.g., a faster pace or louder volume may indicate higher intensity).

At block 606, the system may determine respective sentiment levels of the voice data (e.g., a first sentiment level of the first voice data corresponding to a first time when the first voice data was spoken, a second sentiment level of the second voice data corresponding to a second time when the second voice data was spoken, and so forth). For example, pace (e.g., words per unit time), pitch, loudness, specific words, and other characteristics may indicate a more positive or more negative sentiment level. The voice data may be scored with a level of confidence that the voice data indicates a more positive or more negative sentiment level based on language analysis that results in vectors (e.g., feature data) that provides values indicating speech characteristics, such as pitch, loudness, pace, and the like, with different values of the characteristics corresponding to a sentiment level (e.g., a higher pitch may indicate a more negative sentiment level, a slower pace may indicate a neutral sentiment level, etc.).

At block 608, the system may select a presentation color for any respective sentiment level. For example, when the sentiment level is positive, the color may be a vibrant blue, whereas a negative sentiment level may be a deep red, with less vibrant blue and red indicating slightly positive and slightly negative, respectively, and a yellow or orange indicating a neutral sentiment level. Other color schemes may be used. In this manner, the displays of the devices in FIGS. 1-5 may present colors using light emitting diodes (LEDs) or other display elements. The colors use to present the sentiment level at one or more times may correspond to a color displayed by one or more pixels at one or more locations of a device (e.g., with the location corresponding to a time when the voice data was detected).

At block 610, the system may determine a brightness level with which to present any respective presentation color. A presentation color used to indicate a sentiment level may be presented using multiple pixel brightness levels, with a brighter color presentation indicating a higher energy level for the sentiment level, and a less bright color presentation indicating a lower energy level for the sentiment level. For example, a blue presentation color may indicate a positive sentiment level, and a brighter presentation of the blue may indicate a higher energy level of the positive sentiment level than a less bright presentation of the same blue color. In this manner, the sentiment and intensity of a person's voice may be presented using a two-dimensional sentiment axis in which the presentation color may represent the sentiment level, and the brightness with which the presentation color is presented may represent the energy level.

At block 612, the system may present (or facilitate presentation by sending the color and brightness level data to another device for presentation) indicators of the respective sentiment levels and energy levels indicated by the presentation colors and brightness levels with which the presentation colors are presented. The indicators may be presented as shown in FIGS. 2A-4, in which one presentation color presented at one brightness level may indicate a sentiment level and an intensity level at a given moment in time, or in which one or more multiple presentation colors presented with one or more brightness levels may indicate respective sentiment levels and intensity levels at one or multiple moments in time.

At block 614, optionally, the system may receive a user selection indicating a request to see additional information regarding the sentiment and intensity levels at a given time. For example, as shown in FIG. 4B, when a user selects a portion of the indicator of one or more sentiment levels and intensity levels, the portion corresponding to a moment or portion of time, the system may identify activities performed by the person before or during the speech (e.g., indicating a correlation between the activities and the person's sentiment and intensity levels at the time), along with an explanation of the presentation color and brightness (e.g., whether the person's sentiment level was positive or negative, whether the intensity level was high or low). At block 616, optionally, the system may present the supplemental information (e.g., as shown in FIG. 4B), which may include display data and/or audio data (e.g., a recording of the person's voice used to determine the sentiment level and intensity level).

In one or more embodiments, the system may select the presentation color based on a combination of the sentiment and intensity levels. For example, a higher intensity level may correspond to a presentation color, a lower intensity level may correspond to a different presentation color, and a neutral intensity level may correspond to another presentation color.

The examples presented herein are not intended to be limiting.

Figure 7:
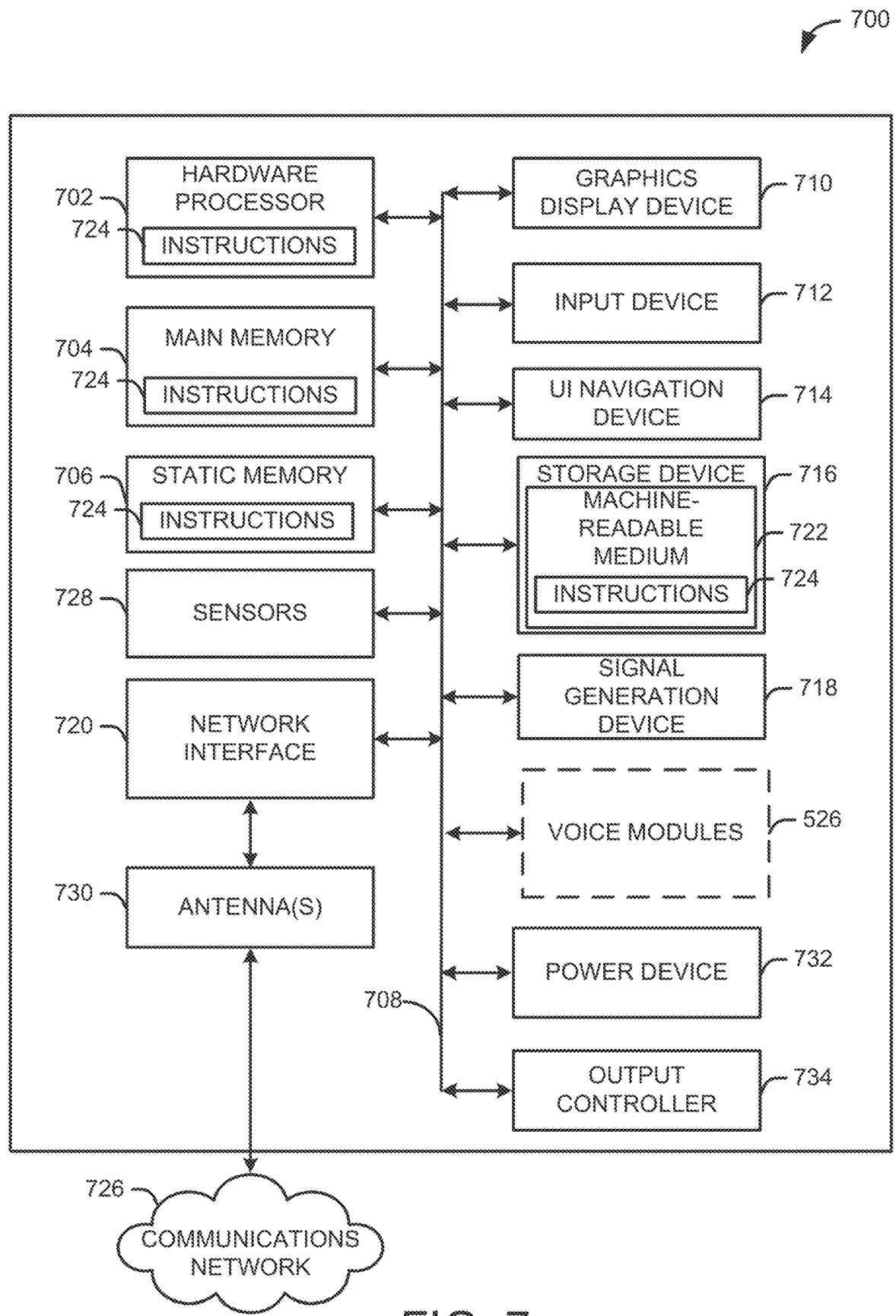
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the one or more devices 120 of FIG. 1, the remote system 502 of FIG. 5) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a tensor processing unit (TPU) having an artificial intelligence accelerator application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker, emitters, etc.), the voice modules 526 of FIG. 5, a network interface device/transceiver 720 coupled to antenna (s) 730, and one or more sensors 728 (e.g., the one or more sensors 522 of FIG. 5, the one or more microphones 520 of FIG. 5). The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method comprising:
receiving, by at least one processor of a device comprising at least a portion of a perimeter reserved for indicating times corresponding to sentiment levels and energy levels, first voice data of a person at a first time;
receiving, by the at least one processor, second voice data of the person at a second time;
determining, by the at least one processor, based on the first voice data, a first energy level of the person at the first time;
determining, by the at least one processor, based on the second voice data, a second energy level of the person at the second time;
determining, by the at least one processor, based on the first voice data, a first sentiment level of the person at the first time;
determining, by the at least one processor, based on the second voice data, a second sentiment level of the person at the second time;
selecting, by the at least one processor, a first presentation color indicative of the first sentiment level;
selecting, by the at least one processor, a second presentation color indicative of the second sentiment level;
determining, by the at least one processor, based on the first energy level, a first light intensity of the at least a portion of the perimeter with which to present the first presentation color;
determining, by the at least one processor, based on the second energy level, a second light intensity of the at least a portion of the perimeter with which to present the second presentation color;
selecting, by the at least one processor, a first location of the at least a portion of the perimeter where a first indication of the first presentation color is to be presented, wherein the first location is indicative of the first time when the first energy level and the first sentiment level were detected using the first voice data;
selecting, by the at least one processor, a second location of the at least a portion of the perimeter where a second indication of the second presentation color is to be presented, wherein the second location is indicative of the second time when the second energy level and the second sentiment level were detected using the second voice data; and
presenting, by the at least one processor, the first indication of the first presentation color and the first time using the first location, and the second indication of the second presentation color and the second time using the second location, wherein the first presentation color is presented using the first light intensity, wherein the second presentation color is presented using the second light intensity, and wherein the first indication and the second indication are presented concurrently.

2. The method of claim 1, wherein:
the device is a wearable watch device comprising a minute hand and an hour hand,
the first location of the wearable watch device corresponds to a first position of the hour hand and a first position of the minute hand,
the second location of the wearable watch device corresponds to a second position of the hour hand and a second position of the minute hand,
the first position of the hour hand and the first position of the minute hand are indicative of the first time, and
the second position of the hour hand and the second position of the minute hand are indicative of the second time.

3. The method of claim 1, wherein:
the device comprises wearable smart glasses or a smartphone,
the first location of the device is indicative of the first time, and
the second location of the device is indicative of the second time.

4. The method of claim 1, further comprising:
receiving third voice data of the person at a third time;
determining, based on the first voice data, a third energy level of the person at the third time;
determining, based on the third voice data, a third sentiment level of the person at the third time, wherein the third sentiment level is the same as the first sentiment level;
selecting the first presentation color as indicative of the third sentiment level;
determining, based on the third energy level, a third light intensity of the at least a portion of the perimeter with which to present the first presentation color for the third sentiment level;
selecting, based on the third time, a third location of the at least a portion of the perimeter; and
presenting a third indication of the first presentation color and the third time using the third location, wherein the third indication is presented using the third light intensity.

5. A method comprising:
receiving, by at least one processor of a device comprising at least a portion of a perimeter reserved for indicating times corresponding to sentiment levels and energy levels, voice data of a person at a time;

determining, by the at least one processor, based on the voice data, an energy level of the person at the time;

determining, by the at least one processor, based on the voice data, a sentiment level of the person at the time;

selecting, by the at least one processor, a presentation color indicative of the sentiment level;

selecting, by the at least one processor, a location of the at least a portion of the perimeter where an indication of the presentation color is to be presented, wherein the location is a subset of the at least a portion of the perimeter and is indicative of the time when the energy level and the sentiment level were detected using the voice data; and presenting, by the at least one processor, the at least a portion of the perimeter comprising the indication of the presentation color and the time at the location and further comprising at least one additional location indicative of another time when the energy level and the sentiment level were not detected.

6. The method of claim 5, further comprising:
receiving second voice data of the person at a second time;
determining, based on the second voice data, an energy level of the person at the second time;
determining, based on the second voice data, a second sentiment level;
selecting a second presentation color indicative of the second sentiment level;
determining, based on the energy level at the second time, a light intensity of the second presentation color;
selecting, based on the second time, a second location of the at least a portion of the perimeter; and
presenting, concurrently with the presentation color, a second indication of the second presentation color and the second time using the second location, the second presentation color presented using the light intensity.

7. The method of claim 6, wherein the at least a portion of the perimeter reserved for indicating times corresponding to sentiment levels and energy levels is indicative of additional sentiment levels and additional intensity levels during a time period of one hour, twelve hours, or twenty-four hours.

8. The method of claim 5, wherein:
the device is a wearable watch device,
the location corresponds to a location on a perimeter of a face of the wearable watch device indicative of the time.

9. The method of claim 8, further comprising:
presenting a second indication of a second presentation color using a second light intensity and a second location of the portion of the wearable watch device corresponding to a second location on the face of the wearable watch device, the second presentation color indicative of a second sentiment level of the person at a second time.

10. The method of claim 5, wherein:
the device comprises wearable smart glasses or a smartphone.

11. The method of claim 10, wherein:
a second indication of a second presentation color is presented at a second location of the at least a portion of the perimeter indicative of a second time,
the second presentation color indicative of a second sentiment level of the person at the second time, and the indication and the second indication are presented concurrently.

12. The method of claim 5, further comprising:
receiving a user request for additional information associated with the indication of the presentation color;
identifying, based on audio data comprising the voice data, a background noise level;
determining that the background noise level exceeds a noise threshold; and
presenting, based on the background noise level exceeding the noise threshold and based on the user request, an indication that the person was in an environment with background noise at the time.

13. The method of claim 5, further comprising:
receiving a user request for additional information associated with the indication of the presentation color;
determining, based on heart rate data or breathing rate data of the person, that the person was moving at the time; and
presenting, based on the user request, an indication that the person was moving at the time.

14. The method of claim 5, wherein determining the sentiment level is further based on at least one of heart rate data or breathing rate data.

15. The method of claim 5, further comprising:
receiving second voice data of the person at a second time;
determining, based on the second voice data, a second sentiment level;
selecting a second presentation color indicative of the second sentiment level;
selecting, based on the second time, a second location of the at least a portion of the perimeter; and
presenting, using the second location of the at least a portion, a second indication of the second presentation color and the second time,
wherein presentation of the indication occurs using a first time or a first frequency, the first time or the first frequency indicative of the sentiment level, and
wherein presentation of the second indication occurs using a second time or a second frequency, the second time or the second frequency indicative of the second sentiment level.

16. The method of claim 5, further comprising:
receiving a user request for additional information associated with the indication of the presentation color;
determining that motion data of the device is indicative of the person performing an exercise at the time; and
presenting, based on the user request and the motion data, an indication that the person was moving at the time.

17. The method of claim 5, further comprising:
receiving a user request for additional information associated with the indication of the presentation color;
identifying calendar application data indicative of an event scheduled at the time; and
presenting, based on the user request and the calendar application data, an indication of the event scheduled at the time.

18. The method of claim 5, wherein the voice data is captured by a microphone of the device.

19. The method of claim 5, wherein the voice data is captured by a microphone of a second device, and wherein the voice data is received from the second device.

20. A device, comprising memory coupled to at least one processor, the at least one processor configured to:
receive voice data of a person at a time;

determine, based on the voice data, an energy level of the person at the time;

determine, based on the voice data, a sentiment level of the person at the time;

select a presentation color indicative of the sentiment level;

determine, based on the energy level, a first light intensity of the presentation color;

select a location, of at least a portion of a perimeter of the device reserved for indicating times corresponding to sentiment levels and energy levels, where an indication of the presentation color is to be presented, wherein the location is a subset of the at least a portion of the perimeter and is indicative of the time when the energy level and the sentiment level were detected using the voice data; and present the at least a portion of the perimeter comprising the indication of the presentation color and the time at the location and further comprising at least one additional location indicative of another time when the energy level and the sentiment level were not detected, the presentation color presented using the first light intensity.

\* \* \* \* \*